US010965395B2

United States Patent
Medina Acosta et al.

(10) Patent No.: US 10,965,395 B2
(45) Date of Patent: Mar. 30, 2021

(54) METHODS AND APPARATUS FOR ENCODING AND DECODING A DOWNLINK CONTROL CHANNEL TRANSMISSION

(71) Applicant: Telefonaktiebolaget LM Ericsson (publ), Stockholm (SE)

(72) Inventors: Gerardo Agni Medina Acosta, Märsta (SE); Waikwok Kwong, Solna (SE); Erik Larsson, Uppsala (SE); Florent Munier, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/326,245

(22) PCT Filed: Aug. 19, 2016

(86) PCT No.: PCT/EP2016/069750
§ 371 (c)(1),
(2) Date: Feb. 18, 2019

(87) PCT Pub. No.: WO2018/033222
PCT Pub. Date: Feb. 22, 2018

(65) Prior Publication Data
US 2019/0190642 A1 Jun. 20, 2019

(51) Int. Cl.
*H04L 1/00* (2006.01)
*H04W 72/04* (2009.01)

(52) U.S. Cl.
CPC ............ *H04L 1/001* (2013.01); *H04L 1/0072* (2013.01); *H04W 72/042* (2013.01)

(58) Field of Classification Search
CPC ..... H04L 1/001; H04L 1/0072; H04W 72/042
See application file for complete search history.

(56) References Cited

U.S. PATENT DOCUMENTS

| 5,930,706 A * | 7/1999 | Raith .................... H04W 68/00 |
| | | 455/422.1 |
| 2002/0110203 A1 | 8/2002 | Sarkar |

(Continued)

FOREIGN PATENT DOCUMENTS

| EP | 1931096 A1 | 6/2008 |
| WO | 2007043105 A1 | 4/2007 |
| WO | 2008022329 A2 | 2/2008 |

OTHER PUBLICATIONS

"3GPP TS 25.211 V13.0.0", 3rd Generation Partnership Project; Technical Specification Group Radio Access Network; Physical channels and mapping of transport channels onto physical channels (FDD) (Release 13), Dec. 2015, pp. 1-67.

(Continued)

*Primary Examiner* — Kashif Siddiqui
(74) *Attorney, Agent, or Firm* — Murphy, Bilak & Homiller, PLLC

(57) ABSTRACT

Methods and apparatus for encoding and decoding a downlink control channel transmission, such as but not exclusively a High Speed Signalling Control Channel, HS-SCCH, transmission, in a wireless communications network. A method in a network node for encoding a downlink control channel transmission, comprises determining that channel conditions are below a threshold level, and in response to determining that channel conditions are below the threshold level, performing at least one of: encoding one or more predetermined control information bits into the downlink control channel transmission, and encoding a reduced number of control information bits into the downlink control channel transmission by omitting one or more control information bits, wherein the one or more omitted control information bits are predetermined control information bits. The method further comprises transmitting the downlink control channel transmission to a user equipment. A method in a (Continued)

user equipment for decoding a downlink control channel transmission, comprises receiving the downlink control channel transmission, and decoding the downlink control channel transmission based on knowledge of the predetermined control information bits.

31 Claims, 11 Drawing Sheets

(56) References Cited

U.S. PATENT DOCUMENTS

| | | | | |
|---|---|---|---|---|
| 2008/0159431 | A1* | 7/2008 | Obuchi | H04L 1/0004 |
| | | | | 375/267 |
| 2009/0300456 | A1* | 12/2009 | Pelletier | H04L 1/1822 |
| | | | | 714/749 |
| 2010/0077276 | A1 | 3/2010 | Okamura et al. | |
| 2012/0044893 | A1* | 2/2012 | Suzuki | H04W 52/0229 |
| | | | | 370/329 |
| 2013/0163535 | A1* | 6/2013 | Anderson | H04L 1/0041 |
| | | | | 370/329 |
| 2013/0322398 | A1* | 12/2013 | Jang | H04L 1/0026 |
| | | | | 370/329 |
| 2017/0134150 | A1* | 5/2017 | Hwang | H04L 5/0055 |
| 2019/0246378 | A1* | 8/2019 | Islam | H04L 1/1896 |

OTHER PUBLICATIONS

"3GPP TS 25.212 V13.0.0", 3rd Generation Partnership Project; Technical Specification Group Radio Access Network; Multiplexing and channel coding (FDD) (Release 13), Sep. 2015, pp. 1-77.

"DL scheduling notification based on regular HS-SCCHcontrol information as part of the new power saving mechanism in CELL_FACH", 3GPP TSG-RAN WG1 Meeting #86; R1-167765; Gothenburg, Sweden, Aug. 22-26, 2016, pp. 1-5.

"RP-162289—Motivation for New Proposed WI", 3GPP; Ericsson; Simplified HS-SCCH for UMTS, Dec. 4, 2016, pp. 1-6.

* cited by examiner

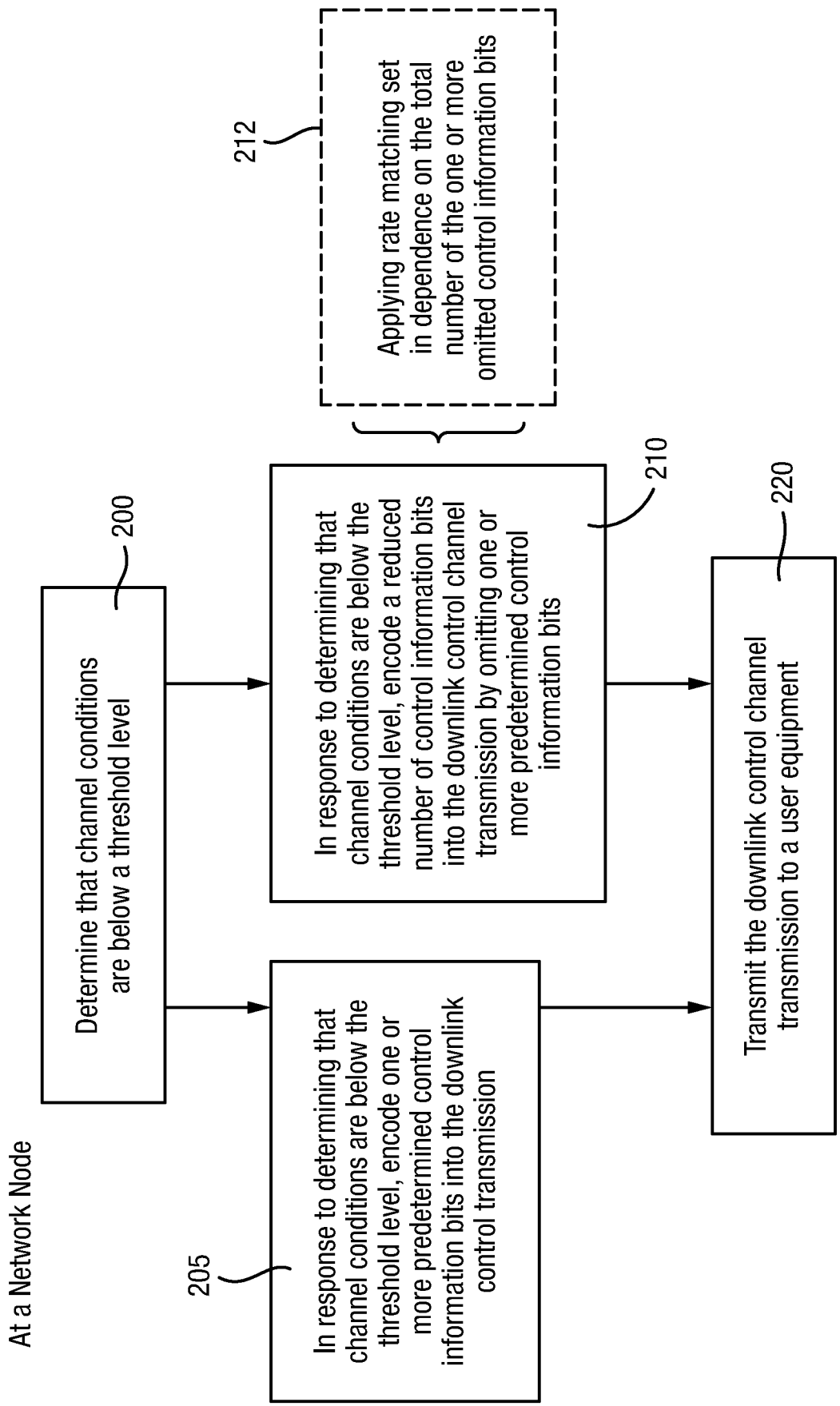

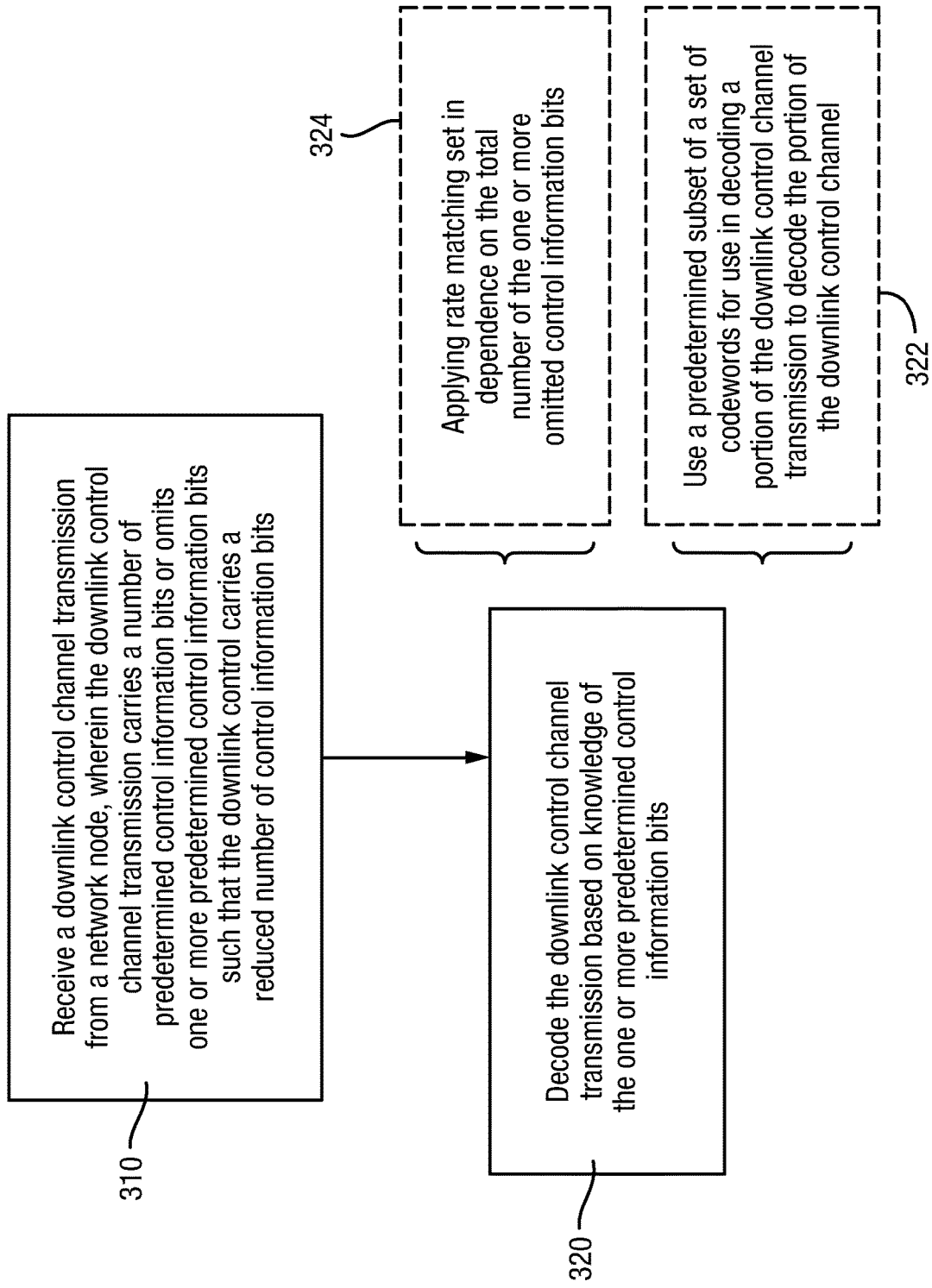

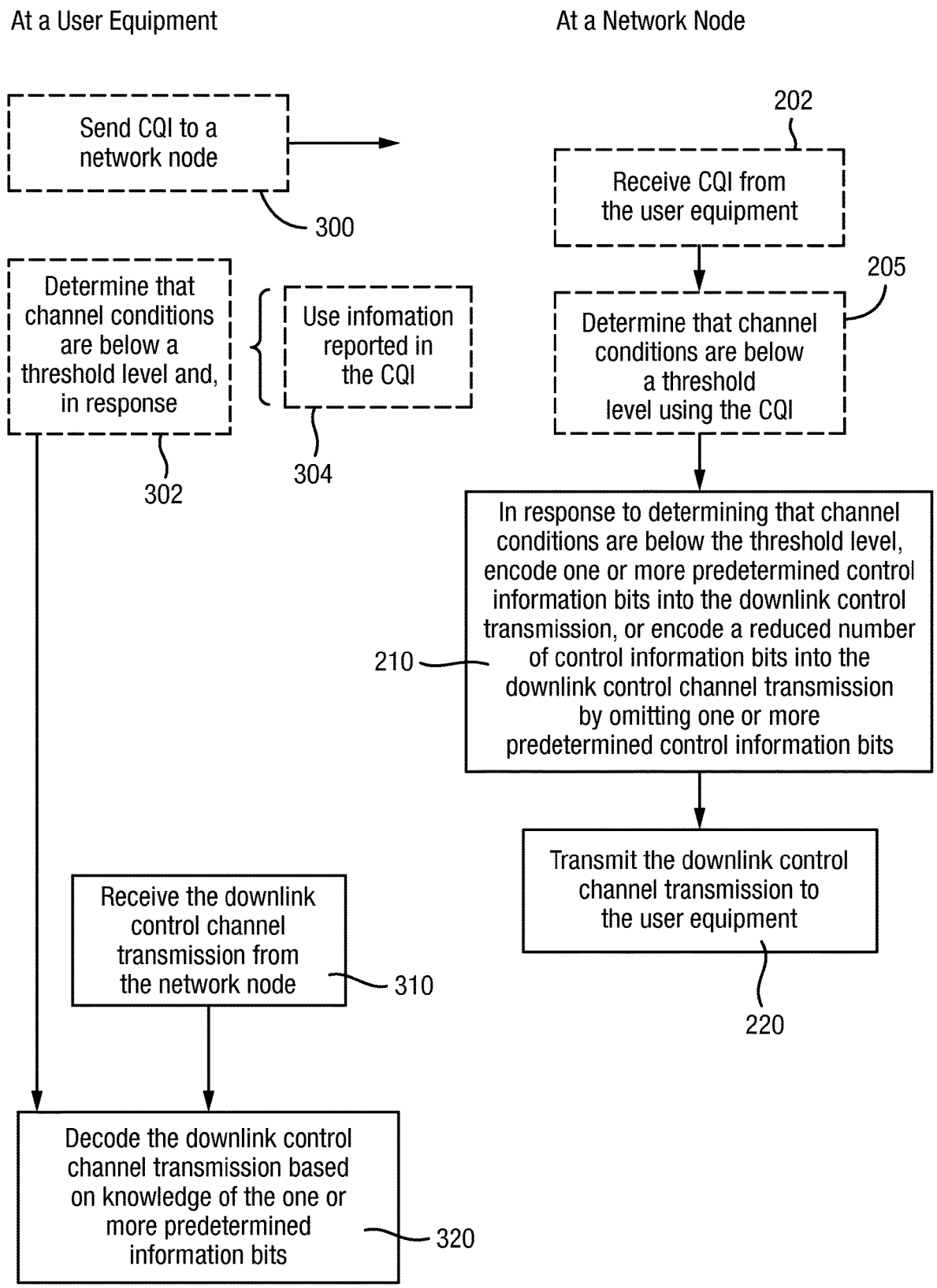

Given P (multi-)codes starting at code 0
Example
When P = 5, and O = 7
Xccs1.Xccs2.Xccs3 = min(P-1,15-P)
   = 4
and
Xccs4.Xccs5.Xccs6.Xccs7 = |O-1-Floor(P/8)×15|
   = 6
Therefore:
Xccs1.Xccs2.Xccs3 = 100
Xccs4.Xccs5.Xccs6.Xccs7 = 0110

Code "0" is Reserved for Command Channel

| Code Group Indicator (3 bits) | Code Offset Indicator (4 bits) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 | 15,1 |
| 2 | 2,1 | 2,2 | 2,3 | 2,4 | 2,5 | 2,6 | 2,7 | 2,8 | 2,9 | 2,10 | 2,11 | 2,12 | 2,13 | 2,14 | 14,2 | 14,1 |
| 3 | 3,1 | 3,2 | 3,3 | 3,4 | 3,5 | 3,6 | 3,7 | 3,8 | 3,9 | 3,10 | 3,11 | 3,12 | 3,13 | 13,3 | 13,2 | 13,1 |
| 4 | 4,1 | 4,2 | 4,3 | 4,4 | 4,5 | 4,6 | 4,7 | 4,8 | 4,9 | 4,10 | 4,11 | 4,12 | 12,4 | 12,3 | 12,2 | 12,1 |
| 5 | 5,1 | 5,2 | 5,3 | 5,4 | 5,5 | 5,6 | 5,7 | 5,8 | 5,9 | 5,10 | 5,11 | 11,5 | 11,4 | 11,3 | 11,2 | 11,1 |
| 6 | 6,1 | 6,2 | 6,3 | 6,4 | 6,5 | 6,6 | 6,7 | 6,8 | 6,9 | 6,10 | 10,6 | 10,5 | 10,4 | 10,3 | 10,2 | 10,1 |
| 7 | | | | | | | | | 8,8 | 8,7 | 8,6 | 8,5 | 8,4 | 8,3 | 8,2 | 8,1 |

Fig. 5b

Code Offset Indicator (4 bits)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 11 | 12 | 13 | 14 | 15 | 16 | 17 | 18 | 19 | 110 | 111 | 112 | 113 | 114 | 115 | ▨ |

Fig. 5c

Code Offset Indicator (4 bits)

| Code Group Indicator (1 bits) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 11 | 12 | 13 | 14 | 15 | 15 | 17 | 18 | 19 | 110 | 111 | 112 | 113 | 114 | 115 | ▨ |
| 0 | 21 | 22 | 23 | 24 | 25 | 25 | 27 | 28 | 29 | 210 | 211 | 212 | 213 | 214 | ▨ | ▨ |

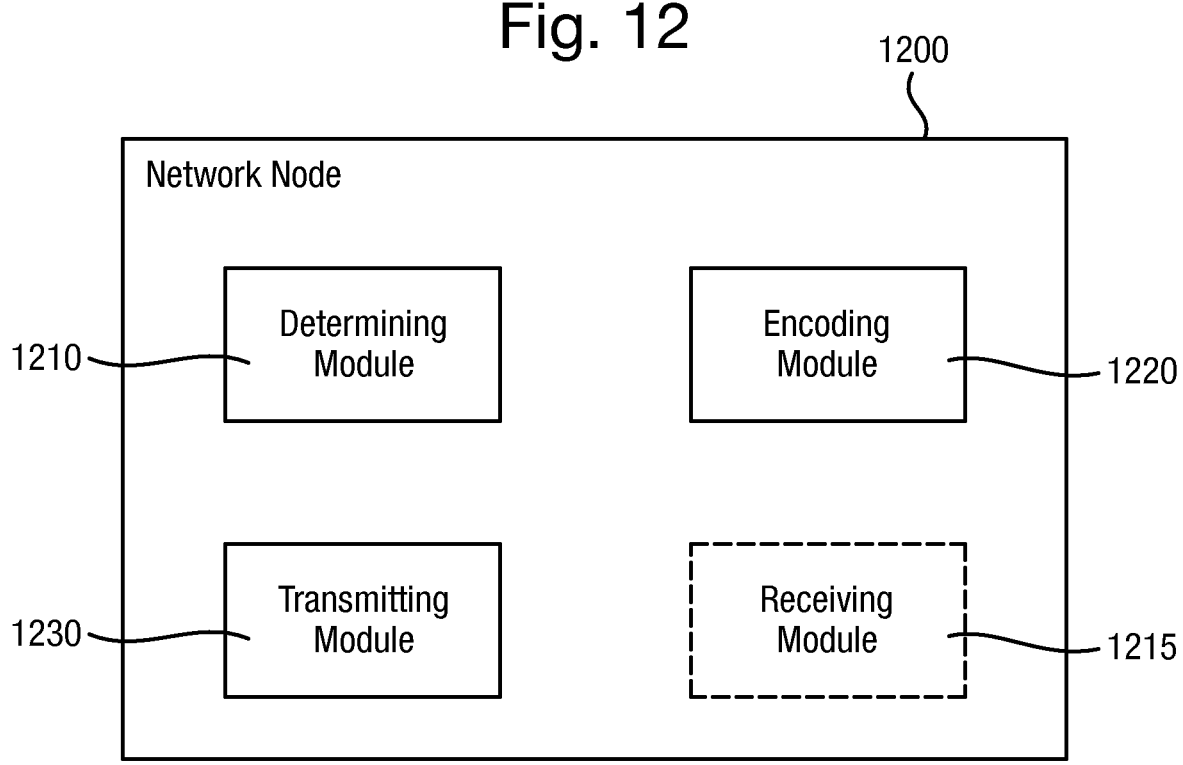
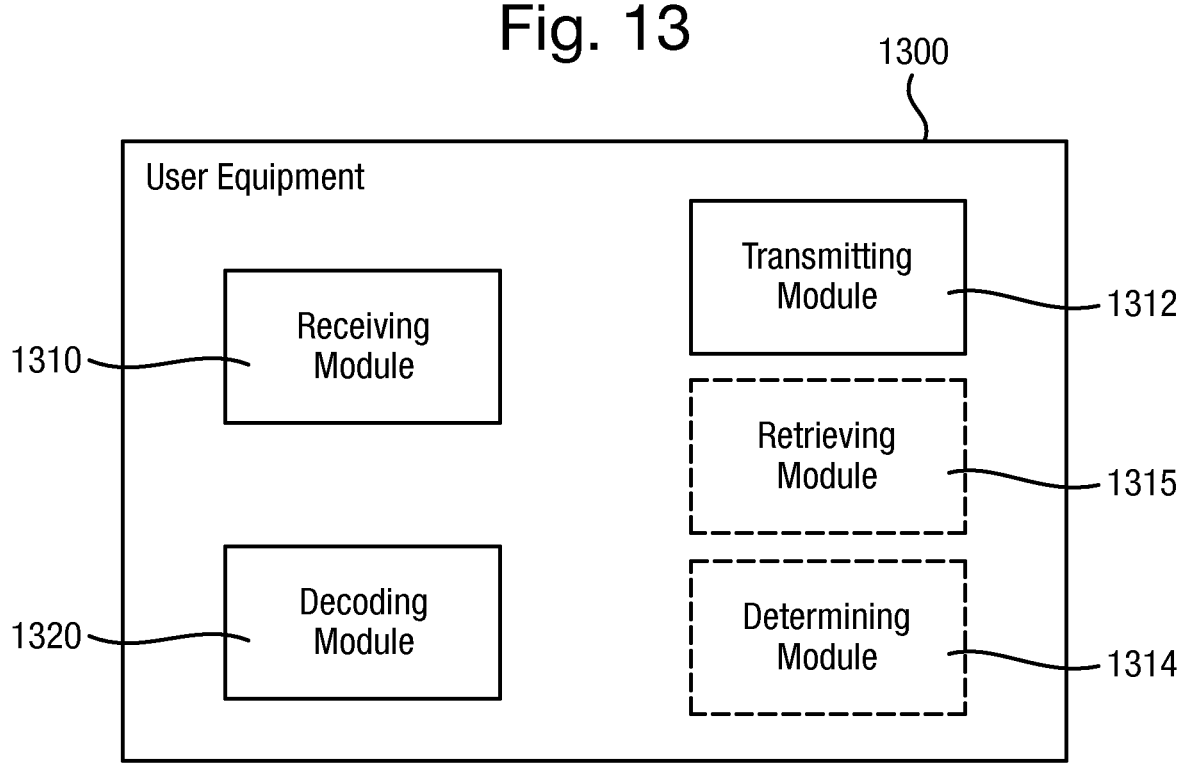

METHODS AND APPARATUS FOR ENCODING AND DECODING A DOWNLINK CONTROL CHANNEL TRANSMISSION

FIELD

The present invention relates to methods and apparatus for encoding and decoding a downlink control channel transmission, such as but not exclusively a High Speed Signalling Control Channel, HS-SCCH, transmission, in a wireless communications network.

BACKGROUND

The HS-SCCH is a fixed rate (60 kbps, SF=128) downlink physical channel used to carry control information related to a HS-DSCH (High Speed Downlink Shared Channel) transmission. A HS-DSCH conveys data to be transmitted in the downlink. The HS-SCCH is specified in 3GPP TS 2.211 "Physical channels and mapping of transport channels onto physical channels (FDD)" version 13.0.0, release 13.

A HS-SCCH type 1 contains the following fields:
Structure of the HS-SCCH Type1 (Control Information Fields):
Channelization-code-set information (7 bits): $x_{ccs,1}$, $x_{ccs,2}$, . . . , $x_{ccs,7}$
Modulation scheme information (1 bit): $x_{ms,1}$
Transport-block size information (6 bits): $x_{tbs,1}$, $x_{tbs,2}$, . . . , $x_{tbs,6}$
Hybrid-ARQ process information (3 bits): $x_{hap,1}$, $x_{hap,2}$, $x_{hap,3}$
Redundancy and constellation version (3 bits): $x_{rv,1}$, $x_{rv,2}$, $x_{rv,3}$
New data indicator (1 bit): $x_{nd,1}$
UE identity (16 bits): $x_{ue,1}$, $x_{ue,2}$, . . . , $x_{ue,16}$ FIG. 1 illustrates the Layer 1, L1, processing chain for a HS-SCCH type 1 transmission, as specified in 3GPP TS 25.212 "Multiplexing and channel coding (FDD)" version 13.0.0, release 13.

The HS-SCCH control information is transmitted in one subframe, which is composed of three slots: slot 0 (known as a HS-SCCH part 1), and slots 1 and 2 (known as a HS-SCCH part 2). Both the "Channelization-code-set information" (bits $x_{ccs}$) and the "Modulation scheme information" (bit $x_{ms}$) are transmitted in slot 0 (i.e. in HS-SCCH part 1), while the "Transport-block size information" (bits $x_{tbs}$), "Hybrid-ARQ process information" (bits $x_{hap}$) Redundancy and constellation version" (bits $x_{rv}$), and the "New data indicator" (bit $x_{nd}$) are conveyed over slot 1 and slot 2 (i.e. in HS-SCCH part 2). The "UE identity" (bits $x_{ue}$) is masked in both HS-SCCH part 1 and part 2, as shown in FIG. 1.

The branch inputting to the "UE specific masking" 40 in the left hand processing chain of FIG. 1 (which encodes the channelization code set information and modulation scheme information into HS-SCCH part 1) is not explicitly shown in the standard. This branch shows an encoding process of the "UE identity" into the HS-SCCH part 1. This process uses Channel Coding of "coding rate ½" 42 and rate matching 44 corresponding to "Rate matching 1" 30 in the processing chain located in the center of FIG. 1 (left hand processing chain as depicted in the standard). On the other hand, the "UE identity" is masked into part 2 of the HS-SCCH with a CRC calculated from $X_1$ and $X_2$ shown FIG. 1. The CRC is then attached to the Transport-block size information, Hybrid-ARQ process information, Redundancy and constellation version and the New data indicator in HS-SCCH part 2 60 as shown in the right hand processing chain of FIG. 1.

The lengths of the bit sequences at each stage of the respective processing chains have been indicated in FIG. 1. In respect of the left hand processing chain multiplexing, "mux" 10 of the "Channelization-code-set information" (bits $x_{ccs}$) and the "Modulation scheme information" (bit $x_{ms}$) produces $X_1$ 8 bits. "Channel Coding 1" of ⅓ 20 (zero-tailed) is then applied, which produces $Z_1$ 48 bits. "Rate matching 1" 30 then reduces the number of bits to $R_1$ 40 bits, which after being masked with an encoded version of the UE Identity (40 bits), are fitted into slot 0 of a HS-SCCH subframe (as shown next to the "Physical channel mapping" step 90). Similarly, in the right hand processing chain the bits "Transport-block size information" (bits $x_{tbs}$), "Hybrid-ARQ process information" (bits $x_{hap}$), Redundancy and constellation version" (bits $x_{rv}$), and the "New data indicator" (bit $x_{nd}$) are multiplexed at 50 to produce $X_2$ 13 bits. After the "UE specific CRC attachment" there is Y 29 bits. "Channel coding 2" 70 is then applied, which produces $Z_2$ 111 bits. "Rate matching 2" 80 then reduces the number of bits to $R_2$ 80 bits, which fit into slot 1 and slot 2 of a HS-SCCH subframe (again as shown next to the "Physical channel mapping" step 90).

At a User Equipment, UE, which receives a HS-SCCH transmission, the HS-SCCH is detected/decoded in two stages: The HS-SCCH part 1 (slot 0) is detected/decoded first. This detection/decoding needs to be considered as "passed" before a UE can proceed to decode the HS-SCCH part 2 (slot 1 & 2). Thus, the detection/decoding of a HS-SCCH slot 0 is a key aspect of the performance of the HS-SCCH.

The applicant has appreciated that a problem in relation to performance is that the HS-SCCH is costly in terms of downlink, DL, power, in particular in poor radio conditions.

SUMMARY

According to an aspect of the present invention, there is provided a method in a network node for encoding a downlink control channel transmission. The method comprises determining that channel conditions are below a threshold level, and, in response to determining that channel conditions are below the threshold level, performing at least one of: encoding one or more predetermined control information bits into the downlink control channel transmission, and encoding a reduced number of control information bits into the downlink control channel transmission by omitting one or more control information bits, wherein the one or more omitted control information bits are predetermined control information bits. The method further comprises transmitting the downlink control channel transmission to a user equipment.

According to a further aspect of the present invention there is provided a method in a user equipment for decoding a downlink control channel transmission. The method comprises receiving a downlink control channel transmission from a network node, wherein the downlink control channel transmission carries one or more predetermined control information bits or omits one or more predetermined control information bits such that the downlink control channel transmission carries a reduced number of control information bits. The method further comprises decoding the downlink control channel transmission based on knowledge of the predetermined control information bits.

The present invention has the advantage that it enables an improvement in decoding performance of a downlink control channel at a UE in particular in poor radio conditions. For example, the decoding performance may be improved in terms of BLER (Block Error Rate), "miss detection" and/or "false detection". This is because by fixing one or more of the control information bits, and the UE decoding a downlink control channel transmission based on knowledge of these one or more fixed or predetermined control channel information bits, a reduction in decoding complexity may be achieved at the UE. Thus, the present invention, advantageously, enables power savings in the downlink, DL, in particular in poor radio conditions. For example, according to embodiments of the present invention, a downlink control channel transmission having a reduced Eb/No (bit energy to noise spectral density) ratio may achieve the same performance as a legacy downlink control channel transmission having a higher Eb/No ratio. Network coverage may also therefore be advantageously maintained or improved without increasing DL power.

In a first embodiment, the method at the network node may comprise encoding one or more predetermined control information bits into the downlink control channel transmission. This embodiment has the advantage that the method may be back-compatible for use with legacy UEs. That is, legacy UEs may still be able to decode the downlink control channel carrying the one or more predetermined control information bits (which may be referred to as a "Low cost" downlink control channel). However, the legacy UEs will not benefit from any decoding performance improvement, since they are not configured to make use of knowledge of the one or more predetermined control information bits.

In a second embodiment, the method at the network node may comprise encoding a reduced number of control information bits into the downlink control channel transmission by omitting one or more control information bits, wherein the one or more omitted control information bits are predetermined control information bits. In this embodiment, encoding the reduced number of control information bits into the downlink control channel transmission may comprise applying rate matching, for example using a puncturing pattern, in dependence on the total number of the one or more omitted control information bits.

In a first embodiment, when the downlink control channel transmission carries one or more predetermined control information bits, the method at the UE may comprise decoding the downlink control channel transmission based on knowledge of the predetermined control information bits by using a predetermined subset of a set of codewords for use in determining a portion of the downlink control channel transmission to decode the portion of the downlink control channel transmission. In this way, the number of possible hypothesis (i.e. codewords) which need to be tested by the UE against the received sequence of control information bits is reduced. Thus decoding complexity may be reduced.

In a second embodiment, when the downlink control channel transmission omits one or more predetermined control information bits such that the downlink control channel transmission carries a reduced number of control information bits, the decoding at the UE may comprise applying rate matching, for example using a puncturing pattern, in dependence on the total number of the one or more omitted control information bits.

In some embodiments, determining at the network node that channel conditions are below a threshold level may comprises receiving a Channel Quality Indicator, CQI, from the user equipment and using the Channel Quality Indicator, CQI, to determine that channel conditions are below the threshold level.

In some embodiments, the method at the UE may comprise sending a Channel Quality Indicator, CQI, to the network node.

In a preferred embodiment, the method at the UE may further comprise determining that channel conditions are below a threshold level, and, in response to determining that channel conditions are below a threshold level, decoding the downlink control channel transmission based on knowledge of the predetermined control information bits. This may further reduce decoding complexity, since the UE may only for example use the predetermined subset of codewords to decode the downlink control channel transmission if channel conditions are below a threshold level and so the UE is expecting a "low cost" downlink control channel transmission. However, in other embodiments there may be no such trigger at the UE, and the UE may for example simply attempt to decode each received downlink control channel transmission using knowledge of the predetermined control information bits and, then only if this fails, proceed to decode the received downlink control channel transmission in the usual manner. Or, vice versa the UE may only attempt to decode a received downlink control channel transmission using knowledge of the predetermined control information bits, if normal decoding has failed.

In some embodiments, determining at the UE that channel conditions are below a threshold level may comprise using information reported to the network node in a Channel Quality Indicator, CQI, to determine that channel conditions are below the threshold level. This may facilitate coordination between the network node and the UE.

The downlink control channel transmission may be a High Speed Signalling Control Channel, HS-SCCH transmission. However, it should be appreciated that the invention may be applied to other suitable downlink control channel transmissions.

In particular, when the downlink control channel transmission is a HS-SCCH, the one or more predetermined control information bits may include one or more channelization-code-set information and modulation scheme information bits. Thus, the one or more predetermined control information bits may relate to part 1 of a HS-SCCH. In this case, the "portion" of the downlink control channel referred to above may be part 1 of a High Speed Signalling Control Channel, HS-SCCH. This has the advantage that the decoding performance of part 1 of a HS-SCCH may be improved, which is a key improvement as part 2 of a HS-SCCH is only decoded if part 1 is deemed to be successfully decoded, as explained above.

However, in other embodiments of the present invention, the one or more predetermined control information bits may alternatively, or in addition, be carried in part 2 of a HS-SCCH. That is, the one or more predetermined control information bits may include one or more transport-block size information, Hybrid-ARQ process information, Redundancy and constellation version and New data indicator bits. Where the one or more predetermined control information bits are part of part 2 of a HS-SCCH, the second embodiment where a reduced number of control information bits are encoded into the downlink control channel transmission by omitting one or more predetermined control information bits may be particularly advantageous. This is because, owing to the greater number of bits transmitted in the HS-SCCH part 2 in comparison to the HS-SCCH part 1, reducing the number of bits may better facilitate a reduction in decoding complexity for HS-SCCH part 2, as will be explained in more detail below.

There is further provided a network node configured (i.e. operative) to perform any of the methods described above.

There is further provided a user equipment configured (i.e. operative) to perform any of the method described above.

There is further provided a computer program comprising computer readable instructions which, when performed on a processor, may perform any of the methods described above. There is further provided a computer readable medium comprising the computer program.

DESCRIPTION OF THE DRAWINGS

Embodiments of the present invention will now be described by way of example only, with reference to the accompanying drawings in which:

FIG. 2 illustrates a method at a network node according to an embodiments of the present invention;

FIG. 3 illustrates a method at a user equipment according to an embodiments of the present invention;

FIG. 4 illustrates a method according to preferred embodiments of the present invention;

FIGS. 5a, 5b and 5c illustrate, by way of example only, a legacy channelization code set, a reduced channelization code set (one code only) and a reduced channelization code set (two codes only), respectively;

FIG. 6 illustrates an example predetermined subset of a set of codewords for use in decoding part 1 of a HS-SCCH transmission;

FIG. 12 illustrates a network node according to a further embodiment of the present invention; and FIG. 13 illustrates a user equipment according to a further embodiment of the present invention.

DETAILED DESCRIPTION

Figure 1:
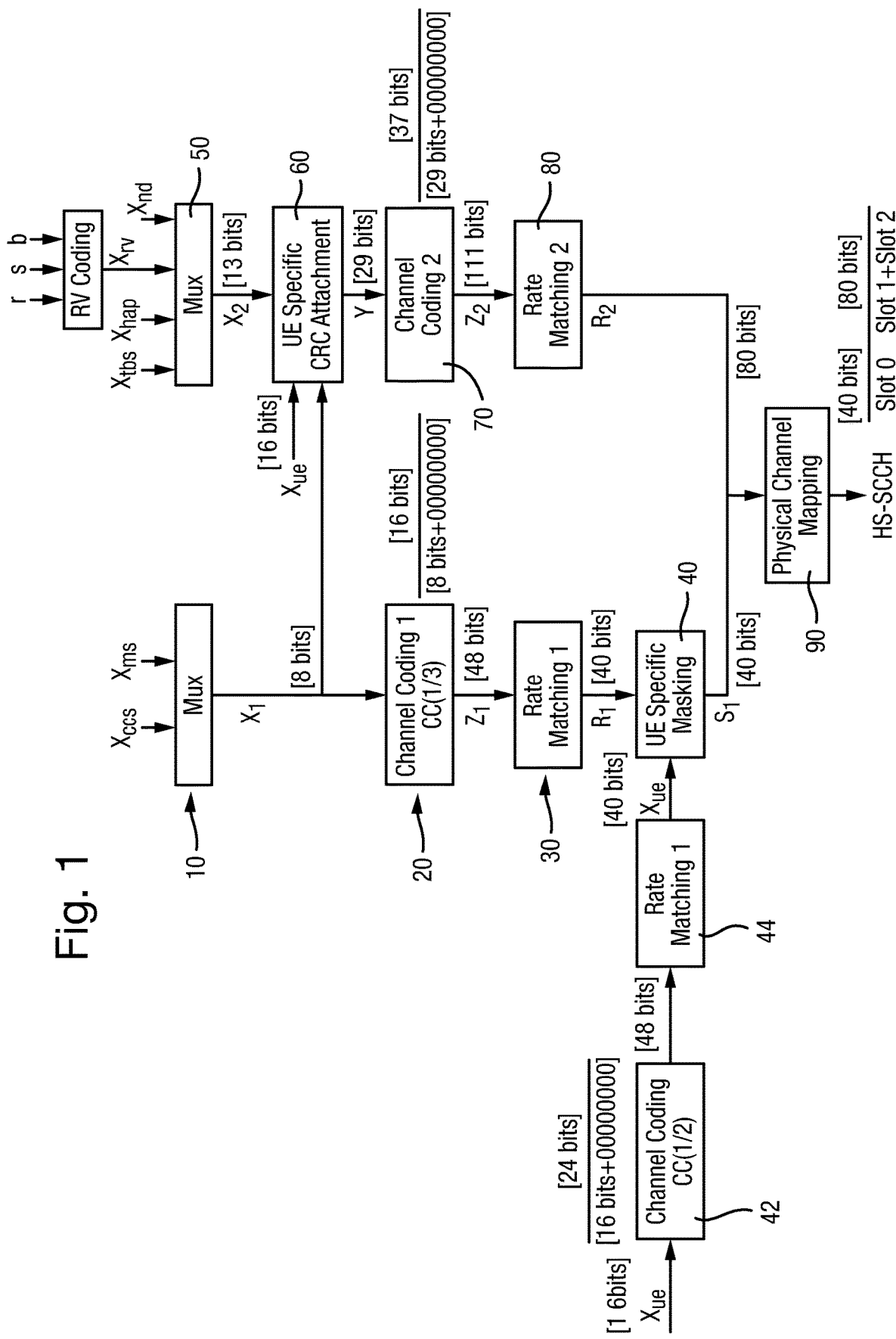
FIG. 1 illustrates the Layer 1, L1, processing chain for a HS-SCCH type 1 transmission.

Embodiments of the present invention provide methods and apparatus for encoding and decoding a downlink control channel transmission, such as but not exclusively a High Speed Signalling Control Channel, HS-SCCH, transmission, in a wireless communications network. The wireless communications network may be a UMTS (Universal Mobile Telecommunications System) mobile cellular system. However, embodiments of the present invention may be used in other types of wireless communications networks, such as by way of example only other 2G/3G networks, LTE (Long-Term Evolution), LTE Advanced or 5G. As indicated above, the downlink control channel transmission may be a HS-SCCH transmission. However, the downlink control channel transmission could alternatively be any other type of downlink control channel transmission.

FIG. 2 illustrates a method at a network node for encoding a downlink control channel transmission according to embodiments of the present invention. The network node may also be referred to as a radio network node, and may for example be a radio access network node such as a base station, for example a node B, or a base station operating in coordination with a base station controller.

The method comprises at 200 determining that channel conditions are below a threshold level. This may be done by monitoring channel conditions, for example by monitoring a parameter indicative of a measure of channel conditions, and comparing the monitored channel conditions to a threshold. The threshold may be predetermined. Alternatively, the network node could for example receive an indication, for example from another network node, that channel conditions are or are expected to be below a threshold level, from which the network node can "determine" that channel conditions are below a threshold level.

The method further comprises, in response to determining that channel conditions are below the threshold level, either at 205 encoding one or more predetermined control information bits into the downlink control channel transmission, or at 210 encoding a reduced number of control information bits into the downlink control channel transmission by omitting one or more control information bits, wherein the one or more omitted control information bits are predetermined control information bits. It may be noted that by virtue of encoding one or more predetermined control information bits into the downlink control channel transmission, the control information which can be conveyed by the downlink control channel transmission is limited. However, the applicant has appreciated that this may be an acceptable trade-off/limitation, in particular in poor radio conditions where certain modes of operation may in any case not be practical. For example, as will be explained below, in poor radio conditions there may be limitations on the "Number of codes" and the "Modulation scheme" that can be used in a downlink data channel (e.g., HS-PDSCH) associated with the downlink control channel (e.g. HS-SCCH).

Where a reduced number of control information bits are encoded into the downlink control channel transmission, encoding 210 may comprise applying 212 rate matching, for example using a puncturing pattern, in dependence on the total number of the one or more omitted control information bits. Thus, in this way, although fewer control information bits are encoded into and thus carried by the downlink control channel transmission, the number of bits actually transmitted in the downlink control channel transmission may remain the same as if the omitted control information bits were included in the downlink control channel transmission. Thus, no modifications to the physical layer mapping/transmission of the downlink control channel transmission may be required.

The method further comprises at 220 transmitting the downlink control channel transmission to a user equipment (UE).

FIG. 3 illustrates a method at a user equipment for decoding a downlink control channel transmission according to embodiments of the present invention. The user equipment can be any type of wireless device capable of communicating with a network node or another UE over radio signals/an air interface. The user equipment may, for example but not exclusively, be a radio communication device, a target device, a D2D (device-to-device) UE, a UE capable of machine to machine type communication, a sensor equipped with a UE, a personal digital assistant, PDA, a tablet, a mobile terminal, a smart phone, a laptop embedded equipment, LEE, a laptop mounted equipment, LE, a USB dongle, Customer Premises Equipment, CPE.

The method at the user equipment comprises at 310 receiving a downlink control channel transmission from a network node, wherein the downlink control channel transmission carries one or more predetermined control information bits or omits one or more predetermined control information bits such that the downlink control channel transmission carries a reduced number of control information bits. The method further comprises at 320 decoding the downlink control channel transmission (e.g. determining a sequence of control information bits encoded in/transmitted over the downlink control channel transmission) based on knowledge of the one or more predetermined control information bits. For example, the decoding may be based on knowledge of which one or more control information bits in the downlink control channel transmission are predetermined (or fixed) and their value (i.e. a "0" or a "1").

By using knowledge of the one or more predetermined control information bits, the decoding complexity at the user equipment may be reduced.

As will be understood by those skilled in the art different types of decoder may be used at a user equipment. For example, the user equipment may use a "Sequential Maximum Likelihood Correlator" to decode at least a portion of a downlink control channel transmission. Such a decoder may compare the received control information bits with all possible codewords and select for example the codeword providing a sufficiently high correlation to pass a predefined threshold as the codeword represented by the control information bits. However, the user equipment could alternatively use another type of decoder. For example, the user equipment could use a "Viterbi decoder", which as will be understood by those skilled in the art instead traces simultaneously different possible paths across a Trellis diagram and selects the path having the best metric as the result. Other types of decoder are possible and will occur to those skilled in the art.

In one embodiment, the downlink control channel transmission carries a number of predetermined control information bits (i.e. the total number of control information bits received by the user equipment on the downlink control channel transmission may be the same as if the downlink control channel transmission were a legacy transmission). In this case, the method at the user equipment may comprise at 322 using a predetermined subset of a set of codewords for use in decoding a portion of the downlink control channel transmission to decode the portion of the downlink control channel transmission. That is, only a predetermined subset of codewords obtained from the full set of codewords may be used when determining the sequence of information bits that was transmitted over the portion of the downlink control channel. The subset of codewords need only include those permutations possible taking into account that a certain one or ones of the control information bits are fixed. Thus, in some embodiments, this may result in the user equipment needing to test significantly fewer codewords against the received control information bits—and thus a corresponding reduction in decoding complexity. However, other ways of decoding a downlink control channel transmission leveraging on knowledge that the downlink control channel transmission carries one or more predetermined control information bits, and so reducing decoding complexity/improving decoding performance, may occur to those skilled in the art.

It should be noted that the "portion" of the downlink control channel transmission mentioned above may comprise only a part of the downlink control channel transmission. For example, as will be explained below, the portion may comprise only part 1 of a HS-SCCH. However, in some embodiments, the "portion" of the downlink control channel transmission could comprise the entire downlink control channel transmission.

The predetermined subset of the set of codewords may for example be stored in a memory at the user equipment. Thus using the predetermined subset of the set of codewords as indicated above may comprise retrieving the subset of the set of codewords from a memory at the user equipment.

As indicated above, the downlink control channel transmission may be a HS-SCCH.

FIGS. 5a, 5b, 5c and 6 illustrate an example implementation of the present invention in relation to a HS-SCCH. In this example, the one or more predetermined control information bits comprise one or more channelization code set information and modulation scheme information bits. Thus, the one or more predetermined control information bits are in the "channelization code set information" field and/or the "modulation scheme information" field in part 1 of a HS-SCCH (i.e. transmitted in slot 0 of a HS-SCCH type 1).

Figure 5A:
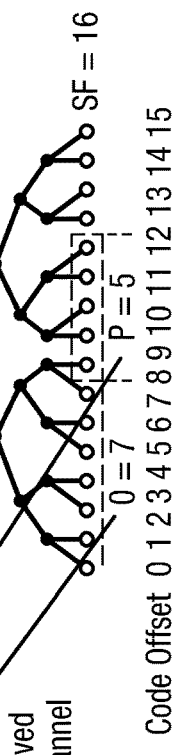

FIGS. 5a, 5b and 5c illustrate, by way of example only, a Channelization Code Set showing codes which may be included in the "channelization code set information" field, a reduced Channelization Code Set (one code only) and a reduced Channelization Code Set (two codes only) respectively.

As mentioned above, the Channelization Code Set (CCS) information consists of seven bits. More particularly, the CCS information is split into two parts: The first part refers to a "Code Group Indicator" which consists of 3 bits from $X_{ccs1}$ to $X_{ccs3}$. The second part refers to a "Code Offset Indicator" which consists of 4 bits, $X_{ccs4}$ from to $X_{ccs7}$. The binary sequence mapped to the CCS bits depends on the variables "P" and "O", which respectively refer to the number of codes used by the downlink transmission and the offset (i.e., the position of the codes) in the channelization code tree. An example of the relation between the CCS bits and the variables "P" and "O" is shown in FIG. 5a.

In the example shown in FIG. 5a, the network node, for example a Node B, has determined that the number of codes of a downlink transmission to be transmitted is five (P=5), while the offset in the channelization code tree is seven (O=7). Upon knowing the value of "P" and "O", the CCS bits are determined as follows:

$$X_{ccs1}, X_{ccs2}, X_{ccs3} = \min(P-1, 15-P) = 100.$$

$$X_{ccs4}, X_{ccs5}, X_{ccs6}, X_{ccs7} = |O-1-(\text{Floor}(P/8))(15)| = 0110.$$

Thus, the CCS bits $X_{ccs1} \ldots X_{ccs7} = 1000110$.

The CCS bits contain the "coordinates" that allow the UE to find the value of "P" and "O" within the "Channelization Code Set matrix" depicted in FIG. 5a.

On the other hand, the Modulation Scheme (MS) bit is used to inform the UE whether the modulation scheme applied on the HS-PDSCH is QPSK or 16-QAM. The interpretation is as follows:

$$x_{ms,1} = 0 \rightarrow \text{QPSK}$$

$$x_{ms,1} = 1 \rightarrow \text{16-QAM}.$$

In this example, a so called "Low Cost HS-SSCH Type 1" or simplified HS-SCCH, which comprises a number of predetermined control information bits, is intended to be utilized by UEs that at most can make use of QPSK with 1 code.

In that case, the "Code Group Indicator" (3 bits) is not needed anymore, and neither is the "Modulation Scheme" bit. Therefore, the HS-SCCH part I can be limited to indicate only the "Code Offset Indicator" field consisting of 4 bits as depicted in FIG. 5b.

Thus, for this simplified version of a HS-SCCH type 1, "P" would be fixed to 1, keeping $X_{ccs4}$, $X_{ccs5}$, $X_{ccs6}$, $X_{ccs7}=|O-1-(Floor(P/8))(15)|$.

Note the combination $X_{ccs4}$, $X_{ccs5}$, $X_{ccs6}$, $X_{ccs7}=1111$ is unused and would remain available for other applications/purposes (e.g., for retransmissions purposes, or instructing the UE to perform a specific action).

On the hand, if using one code only were considered too restrictive, then using two codes may be considered. In that case, the "Code Group Indicator" would consist of 1 bit, in addition to the 4 bits of the Code Offset Indicator as depicted in FIG. 5c. For this simplified version of the HS-SCCH type 1, "P" can take the value of 1 or 2, keeping $X_{ccs4}$, $X_{ccs5}$, $X_{ccs6}$, $X_{ccs7}=|O-1-(Floor(P/8))(15)|$. When "P"=1, the combination $X_{ccs4}$, $X_{ccs5}$, $X_{ccs6}$, $X_{ccs7}=1111$ is unused and would remain available for other applications/purposes (e.g., for retransmissions purposes, or instructing the UE to perform a specific action). When "P"=2, the combinations $X_{ccs4}$, $X_{ccs5}$, $X_{ccs6}$, $X_{ccs7}=1111$ and 1110 are unused and would remain available for other applications/purposes (e.g., for retransmissions purposes, or instructing the UE to perform a specific action).

Thus, for example, where the "Low Cost HS-SCCH type 1" uses only one channelization code, and QPSK modulation, only four bits among all the control information bits carried on the slot 0 (HS-SCCH part 1) are not deterministic. These are the bits used for indicating the Offset in the channelization code tree (i.e., the code position in the channelization code tree).

The mapping of the control information bits carried on the slot 0 of the "Low Cost HS-SCCH Type 1" may therefore be as follows:

$x_{ccs,1}$, $x_{ccs,2}$, $x_{ccs,3}$, =000: Following the legacy format, this bit sequence indicates that only one code is used.

$x_{ccs,4}$, $x_{ccs,5}$, $x_{ccs,6}$, $x_{ccs,7}$,=0000->1110: Following the legacy format, the range for the offset goes from 0 to 14 (meaning offset 1 to 15), since one code is reserved for common channels. In other words, only fifteen out of the sixteen codes are usable code positions.

$x_{ms,1}$=0: Following the legacy format, this means the QPSK modulation is used.

The above means that for the CCS+MS 8-bit sequence, half of the bits are made deterministic i.e. are predetermined:

$x_{ccs,1}$, $x_{ccs,2}$, $x_{ccs,3}$, $x_{ccs,4}$, $x_{ccs,5}$, $x_{ccs,6}$, $x_{ccs,7}$, $x_{ms,1}$,=000????0

Therefore, in this example, when the "Low Cost HS-SCCH type 1" is in use, there are only fifteen possible control information bit sequences that can be transmitted in the HS-SCCH part 1. These possible bit sequences (i.e. codewords) are shown in FIG. 6.

These possible bit sequences thus represent an example predetermining a subset of a set of codewords for use in decoding part 1 of a HS-SCCH transmission according to an embodiment of the present invention. At the UE, this means that the decoding complexity of the HS-SCCH part 1 may be reduced (i.e., fewer hypothesis need to be tested) since the unmasked control information bit sequence needs to be correlated only against in this example 15 codewords instead of against approximately 256 codewords as for a legacy HS-SCCH part 1 transmission where none of the 8 control information bits are predetermined. This enables an improvement in the BLER (Block Error Rate), False Detection and Miss Detection performance.

For illustrative purposes a simulation has been run using a particular setup (targeting 1% BLER and a false detection rate below 10%) for both a legacy HS-SCCH and this example "Low Cost HS-SCCH". The Miss Detection, False Detection, and BLER performance for the legacy and the "Low Cost HS-SCCH" (slot 0, i.e. part 1) is shown in FIGS. 7, 8 and 9 respectively.

Figure 7:
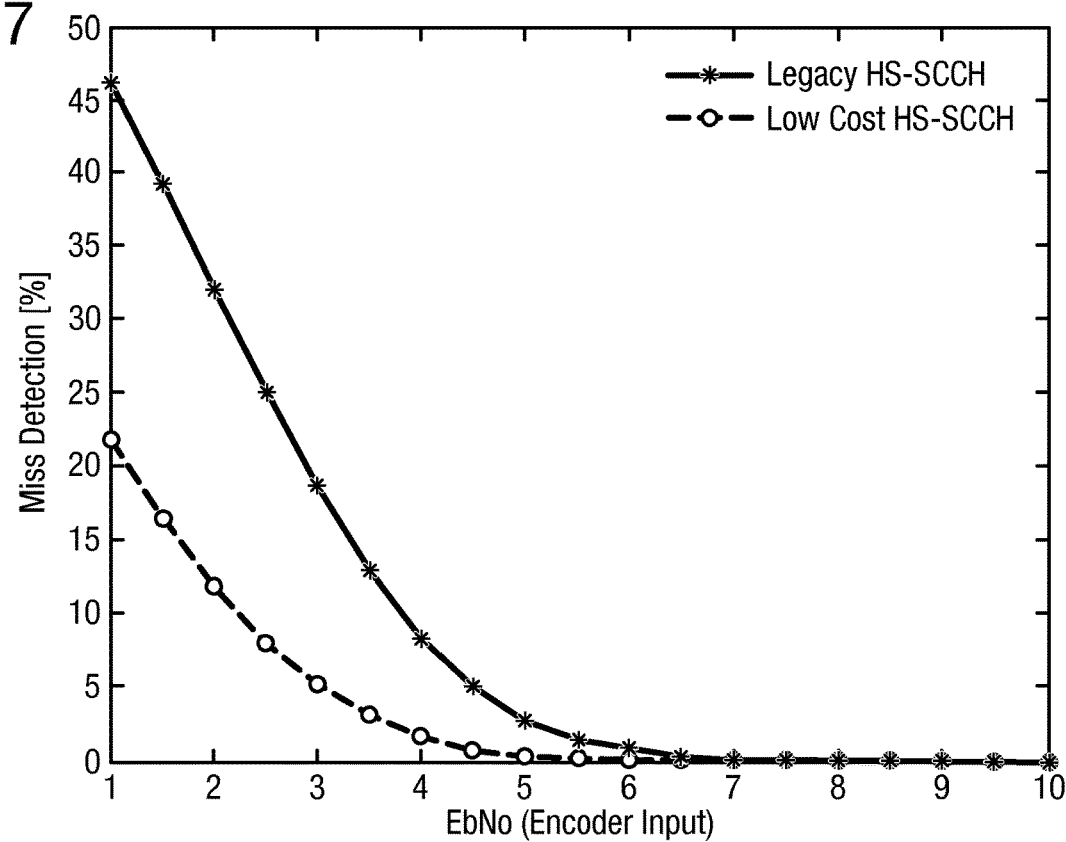
FIG. 7 is a graph showing misdetection performance for a legacy HS-SCCH type 1 versus an example "Low cost" HS-SCCH type 1 (slot 0)

In the graph of FIG. 7 it is seen that the percentage of Miss Detections drops as a function of the Eb/No ratio for both the legacy HS-SCCH and the example "Low Cost HS-SCCH". However, the percentage of Miss Detections drops faster when the "Low Cost HS-SCCH" is utilized, and overall the percentage of Miss Detections is lower for a "Low Cost HS-SCCH". It should be noted that the number of "Miss Detections" impacts the BLER, since in this analysis a transmission that was missed by the UE was counted as a block error.

Figure 8:
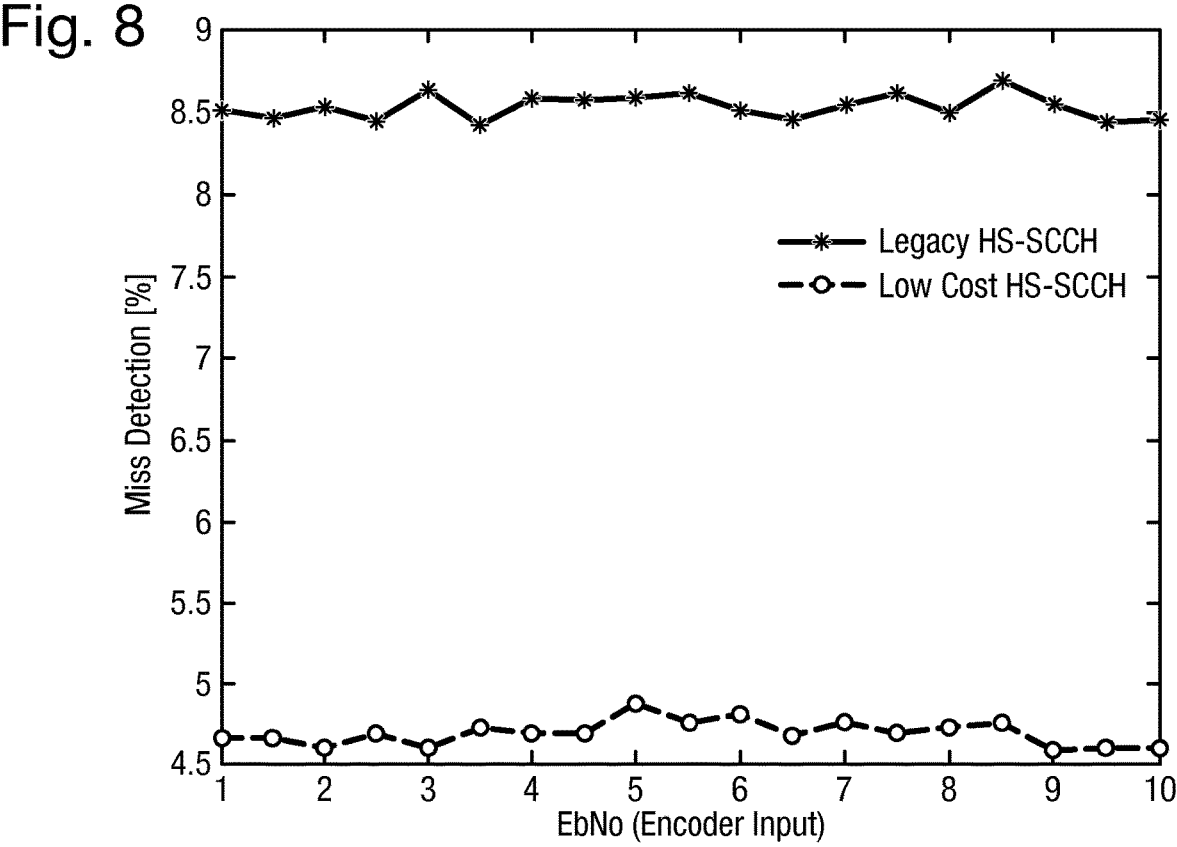
FIG. 8 is a graph showing false detection performance for a legacy HS-SCCH type 1 versus an example "Low cost" HS-SCCH type 1 (slot 0)

FIG. 8 is a graph showing the percentage of False Detections versus Eb/No for a legacy HS-SCCH and the example "low cost HSCCH". It is seen that the percentage of False Detections is substantially the same for different Eb/No ratios for both the legacy HS-SCCH and the example "low cost HS-SCCH". However, it is seen that the percentage of false detection is reduced, almost by half, when the "Low Cost HS-SCCH" is used.

Figure 9:
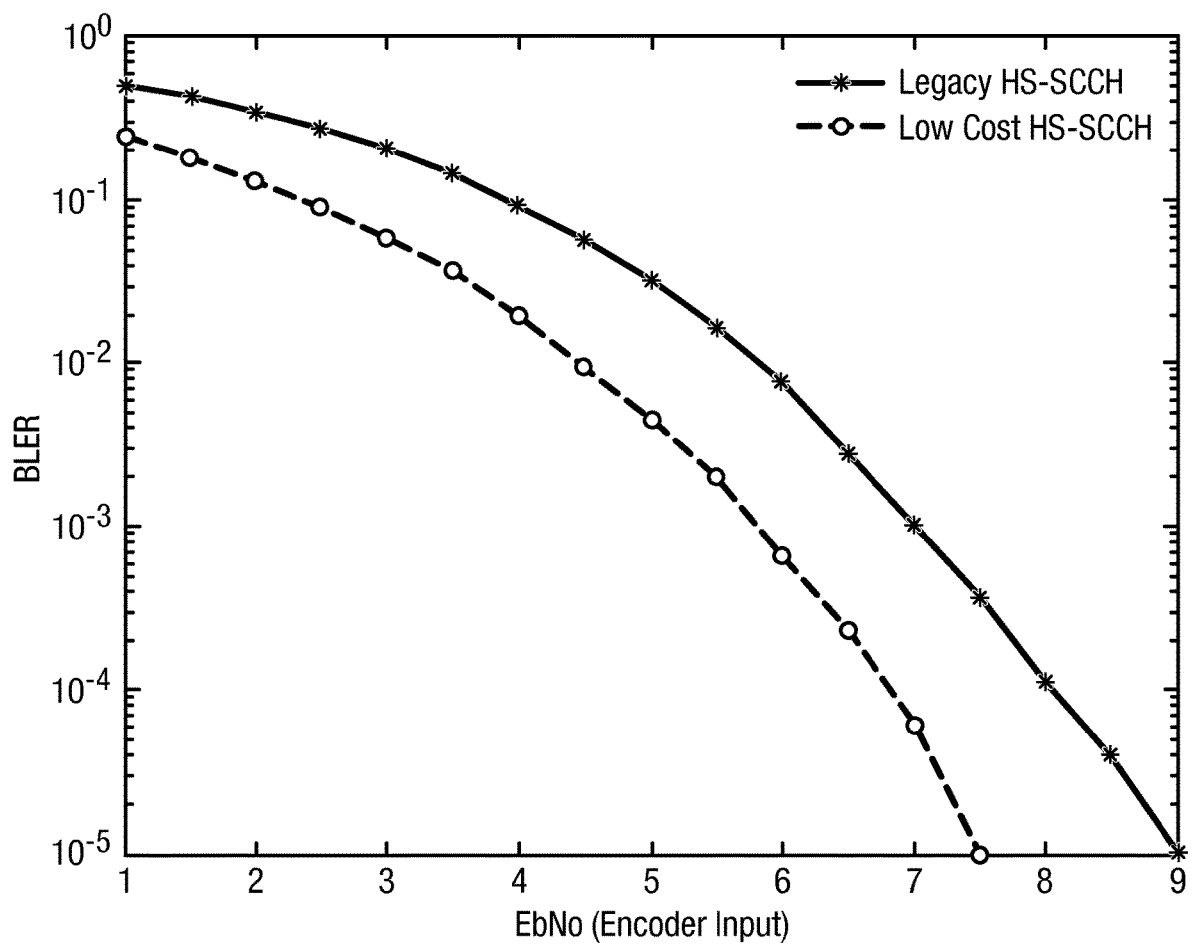
FIG. 9 is a graph showing Block Error Rate, BLER, performance for a legacy HS-SCCH type 1 versus an example "Low cost" HS-SCCH type 1 (slot 0)

FIG. 9 is a graph showing BLER versus Eb/No again for a legacy HS-SCCH versus the example "low cost HS-SCCH". An acceptable BLER target for the HS-SCCH is around 1% (i.e., $10^{-2}$ in the plot depicted in FIG. 9). At that operation point the "low cost HS-SCCH" provides a gain that is around 1.3 dB with respect to the legacy performance.

In the above example, it should be noted that advantageously the "Low cost HS-SCCH" is compatible with legacy UEs, since the predetermined control information bits have been fixed according to a legacy sequence with the desired meaning, i.e. "1 code, QPSK". Thus, a legacy UE would still be able to decode the "Low cost HS-SCCH". However, the legacy UEs will not take advantage of the predetermined control information bits.

Further, in the above example, one or more control information bits in a HS-SCCH part 1 are predetermined. However, according to some examples, one or more control information bits in a HS-SCCH part 2 may in addition or alternatively be predetermined according to embodiments of the present invention.

For example, fixing the number of codes in the HS-SCCH part 1 restricts the content of the control information carried on the HS-SCCH part 2. For example, using only one code implies that the Transport-block size information (6 bits) will not use the full range of possible of "Transport Block" sizes, which opens the possibility of also fixing some of the transport block size information bits. In general, the "Low Cost" simplification strategy can be extended to some other control information fields in the HS-SCCH part 2. For example, the Redundancy and constellation version (3 bits) bit sequence can be fixed too, if for example it is predetermined that either "Chase Combining" or "Incremental Redundancy" will be used when the "Low Cost HS-SCCH" is enabled.

In the above example, the one or more predetermined control information bits are carried in the downlink control channel transmission, and thus received by the UE. However, alternatively as explained above, the one or more predetermined control information bits may be omitted from the downlink control channel transmission. Referring back to FIG. 3, in this case, at 324, decoding the downlink control channel transmission may comprise applying rate matching for example using a puncturing pattern in dependence on the total number of the one or more omitted control information bits. This rate matching may therefore correspond to the rate matching used at the network node in relation to encoding the downlink control channel transmission. Thus, the UE may be able to recover the reduced number of control information bits. Since the UE then only needs to be able to decode fewer control information bits, decoding complexity may be reduced. In addition, this may advantageously be achieved without any or substantial modification to the decoder at the UE, for example if the decoder is a Viterbi decoder.

The Applicant has appreciated that this alternative method for reducing decoding complexity may be suitable for the HS-SCCH part 2 for example. Note that, since the HS-SCCH part 1 and HS-SCCH part 2 are decoded separately, different decoding methods may be used for the two parts. The HS-SCCH part 2 is transmitted over two slots and carries a larger number of control information bits than the HS-SCCH part 1: 13 bits+16 bitsCRC which results in 536870912 (i.e. 2^29) codewords (in comparison to 256 for the HS-SCCH part 1). Even if therefore say 6 bits out of the 29 bits are fixed, 8388608 codewords would still need to be tested. Thus, in this case, making use of a generic decoder such as a Viterbi decoder and omitting the predetermined control information bits may enable an improved decoding performance. For example, the Viterbi decoder may be able to search for the best path in a shorter time.

Taking the HS-SCCH part 2 as an example, in the legacy format as explained above with respect to FIG. 1, 13 bits ($X_{tbs}$, $X_{hap}$, $X_{rv}$, $X_{nd}$)+16 bits (UE_ID)+8 bits (Zero Tail)=37 bits. Channel Coding 70 of a ⅓ CC(⅓) increases the number of bits to 111. Rate matching 80 then reduces the number of bits to 80. If for example six of the control information bits are predetermined—and removed—then instead 7 bits (e.g. $X_{hap}$, $X_{rv}$, $X_{nd}$) 16 bits (UE_ID)+8 bits(ZeroTail)=31 bits. CC(⅓) increases the number of bits to only 93. Thus rate matching is then required to reduce those 93 bits to 80 bits, to fit into slot 1 and 2 of the HS-SCCH. Thus, in the legacy format, rate matching discards 31 bits in order to provide an output of 80 bits. In the modified version, by way of example, rate matching instead discards only 13 bits in order to provide an output of 80 bits. In this case, a corresponding rate matching, e.g. here puncturing 13 bits, needs to be performed at the UE to retrieve the transmitted control information bits.

FIG. 4 illustrates a method for encoding and decoding a downlink control channel transmission according to preferred embodiments of the present invention. Steps which may be performed at a UE are shown on the left-hand side of the page, and steps which may be performed at a network node are shown on the right-hand side of the page. It should be noted that at least some of the steps may be performed in a different order from that indicated in the flow diagram or simultaneously.

In this example, the network node determines that channel conditions are below a threshold level using information in a Channel Quality Indicator, CQI, reported by the UE. For example, if a CQI reports a value below a predetermined threshold (indicative of poor radio conditions), the network node may determine that channel conditions are below a threshold level.

At 300, the UE sends a CQI to the network node. At 202 the network node receives the CQI from the user equipment and at 205 the network node determines that channel conditions are below a threshold level using the CQI. In response to determining that channel conditions are below the threshold level, the network node at 212 or 214, as explained above, encodes a number of predetermined control information bits into the downlink control channel transmission, for example into one or more fields of the downlink control channel transmission. At 220, the network node transmits the downlink control channel transmission to the UE. At 310 the UE receives the downlink control channel transmission. The UE then advantageously at 320 decodes the downlink control channel transmission based on knowledge of the one or more predetermined control information bits.

As indicated in FIG. 4, prior to step 320, the UE may also at 302 determine that channel conditions are below a threshold level. This may be done using information reported in the CQI as indicated at 304. Thus, in response to the determination, the UE may expect a "low cost downlink control channel transmission" (i.e. a downlink control channel transmission carrying or omitting the one or more predetermined control information bits). Thus, in response to the determination, the UE may decode the downlink control channel transmission based on knowledge of the one or more predetermined control information bits.

However, other embodiments are possible. For example, there may be a different or no such trigger at the UE. In the latter case, the UE may for example simply attempt to decode each received downlink control channel transmission using knowledge of the predetermined control information bits and, then only if this fails, proceed to decode the received downlink control channel transmission in the usual manner. Or, vice versa the UE may only attempt to decode a received downlink control channel transmission using knowledge of the predetermined control information bits, if normal decoding has failed.

A network node may be configured to perform any of the methods described above, for example with respect to FIGS. 2 and 4.

Figure 10:
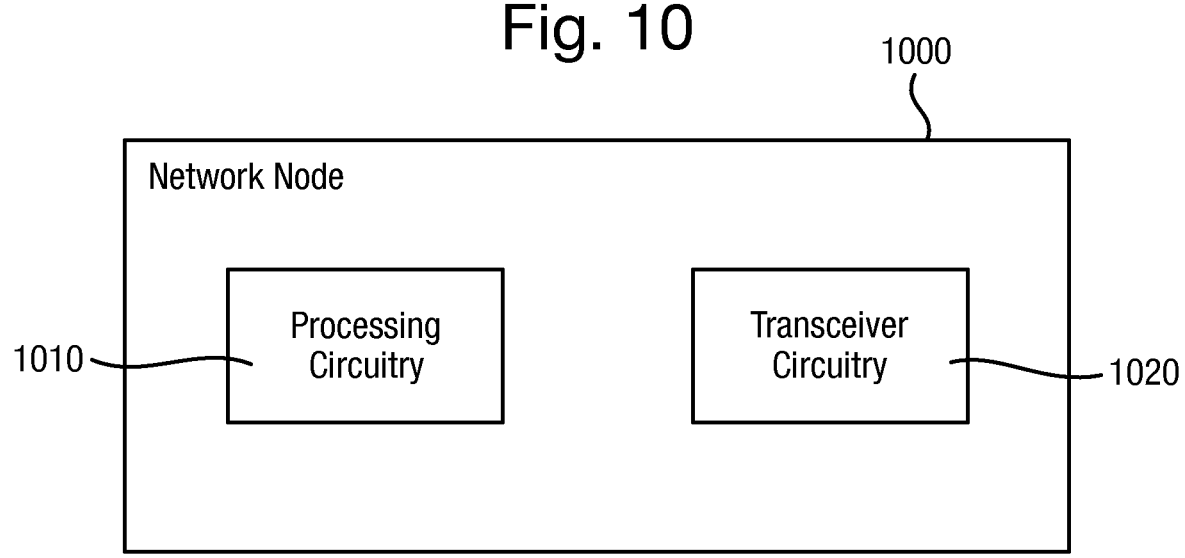
FIG. 10 illustrates a network node according to an embodiment of the present invention.

FIGS. 10 and 12 illustrate a network node 1000, 1200 according to embodiments of the present invention. The network node may be any type of network node that serves a UE and or is connected to another network node or network element or any radio node from where a UE receives a signal. The network node may be a radio access network node, such as a base station (for example a node B) or a base station operating in co-ordination with a base station controller. In some examples the network node may comprise a plurality of a distributed parts or network nodes.

The network node 1000 illustrated in FIG. 10 comprises transceiver circuitry 1010 and processing circuitry 1020. The transceiver circuitry 1010 may include a transmitter circuit, a receiver circuit and associated control circuits that are collectively configured to transmit and receive signals according to a radio access technology, for example according to a wireless communications standard such as GSM (Global System for Mobile Communications), GPRS (General Packet Radio Service), WCDMA (Wideband Code Division Multiple Access), LTE, LTE-Advanced, 5G etc. The processing circuitry 1020 may be operatively associated with the transceiver circuitry 1010. The processing circuitry 1020 may comprise one or more digital processors, for example one or more microcontrollers, digital signal processors, DSPs, field programmable gate arrays, FPGAs, complex programmable logic devices, CPLDs, application specific integrated circuits, ASIC or any combination thereof. In general, the processing circuitry 1020 may comprise fixed circuitry or programmable circuitry that is specially configured via the execution of program instructions implementing functionality taught therein, or include some combination of fixed and programmable circuitry. The processing circuitry 1020 may also comprise a memory. In some embodiments, the memory may store one or more computer programs and optionally configuration data. The memory may comprise any type of computer readable media, such as disk storage, solid state memory storage or for example SRAM (Static Random Access Memory), DRAM (Dynamic Random Access Memory), EEPROM (Electrically Erasable Programmable Read-Only Memory) and flash memory.

The processing circuitry 1020 may be configured, via the transceiver circuitry 1010, to determine that channel conditions are below a threshold level, and, in response to determining that channel conditions are below the threshold level, encode a number of predetermined control information bits into one or more fields of the downlink control channel transmission or encode a reduced number of control information bits into the downlink control channel transmission by omitting one or more control information bits, wherein the one or more omitted control information bits are predetermined control information bits. The processing circuitry 1020 may further be configured to transmit the downlink control channel transmission to a user equipment.

In general, the processing circuitry 1020 may be configured to perform any of the methods described above, for example described with respect to FIGS. 2 and 4.

The processing circuitry 1020 may further be configured to, when encoding the reduced number of control information bits into the downlink control channel transmission, apply rate matching for example using a puncturing pattern in dependence on the total number of the one or more omitted control information bits.

In some embodiments, the processing circuitry 1020 may be configured to determine that channel conditions are below a threshold level by receiving a Channel Quality Indicator, CQI, from the user equipment and using the Channel Quality Indicator, CQI, to determine that channel conditions are below the threshold level.

The downlink control channel transmission may be a High Speed Signalling Control Channel, HS-SCCH. The one or more predetermined control information bits may include at least one or more channelization-code-set information and the modulation scheme information bits.

FIG. 12 illustrates a network node 1200 according to a further embodiment of the present invention. In this embodiment, the network node 1200 comprises a determining module 1210 for determining that channel conditions are below a threshold level. The network node 1200 further comprises an encoding module 1220 for, in response to determining that channel conditions are below the threshold level, encoding a number of predetermined control information bits into the downlink control channel transmission or encode a reduced number of control information bits into the downlink control channel transmission by omitting one or more control information bits, wherein the one or more omitted control information bits are predetermined control information bits. The network node 1200 further comprises a transmitting module 1230 for transmitting the downlink control channel transmission to a user equipment.

When the downlink control channel transmission omits the one or more predetermined control information bits, the encoding module 1220 may be for applying rate matching for example using a puncturing pattern in dependence on the total number of the one or more omitted control information bits.

In some embodiments, the network node 1200 may further comprise a receiving module 1215 for receiving a Channel Quality Indicator, CQI, from the user equipment. In this case, the determining module 1210 may be for determining that channel conditions are below a threshold level using the Channel Quality Indicator, CQI.

As indicated above, the downlink control channel transmission may be a High Speed Signalling Control Channel, HS-SCCH. The one or more predetermined control information bits may include one or more channelization-code-set information and the modulation scheme information bits.

The determining module 1210, encoding module 1220, transmitting module 1230 and the receiving module 1215 may comprise any combination of software and or hardware, and may for example comprise transceiver circuitry and or processing circuitry as defined above. The modules 1210, 1220, 1230 and 1215 may be integrated or distributed to any degree.

Similarly, a user equipment, UE, may be configured to perform any of the methods described above, for example those described with respect to FIGS. 3 and 4.

Figure 11:
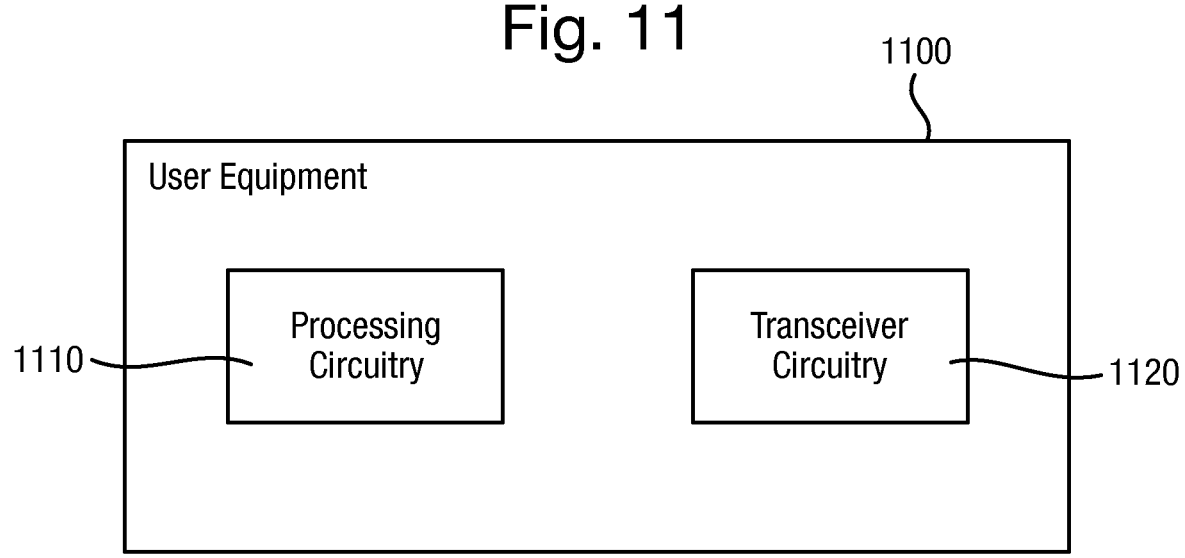
FIG. 11 illustrates a user equipment according to an embodiment of the present invention.

FIGS. 11 and 13 illustrates a user equipment 1100, 1300 according to embodiments of the present invention. The user equipment 1100, 1300 can be any type of wireless device capable of communicating with a network node or another UE over radio signals/an air interface. The user equipment 1100, 1300 may, for example but not exclusively, be a radio communication device, a target device, a D2D (device-to-device) UE, a UE capable of machine to machine type communication, a sensor equipped with a UE, a personal digital assistant, PDA, a tablet, a mobile terminal, a smart phone, a laptop embedded equipment, LEE, a laptop mounted equipment, LE, a USB dongle, Customer Premises Equipment, CPE.

In the embodiment illustrated in FIG. 11, the user equipment 1100 comprises transceiver circuitry 1110 and processing circuitry 1120. The transceiver circuitry 1110 may include a transmitter circuit, a receiver circuit and associated control circuits that are collectively configured to transmit and receive signals according to a radio access technology, for example according to a wireless communications standard such as GSM (Global System for Mobile Communications), GPRS (General Packet Radio Service), WCDMA (Wideband Code Division Multiple Access), LTE, LTE-Advanced, 5G etc. The processing circuitry 1020 may be operatively associated with the transceiver circuitry 1010. The processing circuitry 1020 may comprise one or more digital processors, for example one or more microcontrollers, digital signal processors, DSPs, field programmable gate arrays, FPGAs, complex programmable logic devices, CPLDs, application specific integrated circuits, ASIC or any combination thereof. In general, the processing circuitry 1120 may comprise fixed circuitry or programmable circuitry that is specially configured via the execution of program instructions implementing functionality taught therein, or include some combination of fixed and programmable circuitry. The processing circuitry 1020 may also comprise a memory. In some embodiments, the memory may store one or more computer programs and optionally configuration data. The memory may comprise any type of computer readable media, such as disk storage, solid state memory storage or for example SRAM (Static Random Access Memory), DRAM (Dynamic Random Access Memory), EEPROM (Electrically Erasable Programmable Read-Only Memory) and flash memory.

The processing circuitry 1110 is configured, via the transceiver circuitry 1110, to receive a downlink control channel transmission from a network node, wherein the downlink control channel transmission carries one or more predetermined control information bit or omits one or more predetermined control information bits such that the downlink control channel transmission carries a reduced number of control information bits. The processing circuitry 1110 is further configured to decode the downlink control channel transmission based on knowledge of the predetermined control information bits.

In general, the processing circuitry 1110 may be configured to perform any of the methods described above, for example described with respect to FIGS. 3 and 5.

When the downlink control channel transmission carries the one or more predetermined control information bits, the processing circuitry 1110 may be configured to use a predetermined subset of a set of codewords for use in determining a portion of the downlink control channel transmission to decode the portion of the downlink control channel transmission.

When the downlink control channel transmission omits the one or more determined control information bits, the processing circuitry 1110 may be configured to decode the downlink control channel transmission based on knowledge of the one or more predetermined control information bits by applying rate matching for example using a puncturing pattern in dependence on the total number of the one or more omitted control information bits.

In some embodiments, the processing circuitry 1110 may further be configured to send a Channel Quality Indicator, CQI, to the network node 1000, 1200.

In some embodiments, the processing circuitry 1110 may further be configured to determine that channel conditions are below a threshold level, and, in response to determining that channel conditions are below a threshold level, decode the downlink control channel transmission based on knowledge of the one or more predetermined control information bits.

The processing circuitry 1110 may be configured to determine that channel conditions are below a threshold level by using information reported in the Channel Quality Indicator, CQI.

The downlink control channel transmission may be a High Speed Signalling Control Channel, HS-SCCH. The portion of the downlink control channel mentioned above may be part 1 of a High Speed Signalling Control Channel, HS-SCCH.

FIG. 13 illustrates a user equipment 1300 according to a further embodiment of the present invention. The user equipment 1300 comprises a receiving module 1310 for receiving a downlink control channel transmission from a network node, wherein the downlink control channel transmission carries one or more predetermined control information bits or omits a number of predetermined control information bits such that the downlink control channel transmission carries a reduced number of control information bits. The user equipment 1300 may further comprise a decoding module 1320 for decoding the downlink control channel transmission based on knowledge of the predetermined control information bits.

The decoding module 1320 may be for, when the downlink control channel transmission carries one or more predetermined control information bits, using a predetermined subset of a set of codewords for use in determining a portion of the downlink control channel transmission to decode the portion of the downlink control channel transmission. In an embodiment, the UE may comprise a retrieving module 1315 for retrieving the predetermined subset of the set of codewords from a memory in the User Equipment 1300.

The decoding module 1320 may be for, when the downlink control channel transmission carries the reduced number of control information bits, applying rate matching for example using a puncturing pattern in dependence on the total number of the one or more omitted control information bits.

The user equipment 1300 may further comprise a transmitting module 1312 for sending a Channel Quality Indicator, CQI, to the network node.

In some embodiments, the user equipment 1300 may further comprise a determining module 1314 for determining that channel conditions are below a threshold level. In this case, the decoding module 1320 may be for, in response to determining that channel conditions are below a threshold level, decoding the downlink control channel transmission using knowledge of the one or more predetermined control information bits.

The determining module may be for determining that channel conditions are below a threshold level by using information reported in the Channel Quality Indicator, CQI.

The downlink control channel transmission may be a High Speed Signalling Control Channel, HS-SCCH. The portion of the downlink control channel referred to above may be part 1 of a High Speed Signalling Control Channel, HS-SCCH.

The receiving module 1310, decoding module 1320, transmitting module 1312, retrieving module 1315 and determining module 1314 may comprise any combination of software and or hardware, and may for example comprise transceiver circuitry and or processing circuitry as defined above. The modules 1310, 1320, 1330 and 1314 may be integrated or distributed to any degree.

There may also be provided a computer program configured to, when run on a processor, perform any of the methods described above. The computer program may be stored on a non-transitory computer readable medium, such as by way of example only disk storage, solid state memory storage or for example SRAM (Static Random Access Memory), DRAM (Dynamic Random Access Memory), EEPROM (Electrically Erasable Programmable Read-Only Memory) and flash memory.

Thus, embodiments of the present invention have the advantage that decoding performance of a downlink control channel transmission may be improved, for example in terms of one or more of BLER, miss detection and false detection, in particular in poor radio conditions. Thus, advantageously, the downlink power required by the downlink control channel may be reduced, or maintained with a corresponding increase in for example network coverage. Furthermore, some embodiments, where the one or more predetermined control information bits are carried in the downlink control channel transmission, may advantageously be back-compatible, whereby legacy UEs may still be able to decode the downlink control channel transmission although they cannot benefit from an improvement in decoding performance.

The invention claimed is:

1. A method in a network node for encoding a downlink transmission of High-Speed Signalling Control Channel, HS-SCCH control information bits, comprising:
    determining that channel conditions are below a threshold level;
    in response to determining that channel conditions are below the threshold level:

encoding one or more of the HS-SCCH control information bits as one or more predetermined control information bits into the downlink transmission, wherein the one or more predetermined control information bits comprise one or more channelization-code-set information bits and/or one or more modulation scheme information bits, or encoding a reduced number of HS-SCCH control information bits into the downlink transmission by omitting one or more HS-SCCH control information bits, wherein the one or more omitted HS-SCCH control information bits are one or more predetermined control information bits; and transmitting the encoded HS-SCCH control information bits to a user equipment.

2. The method according to claim 1, comprising, in response to determining that channel conditions are below the threshold level, encoding one or more of the HS-SCCH control information bits as one or more predetermined control information bits into the downlink transmission.

3. The method according to claim 1, comprising, in response to determining that channel conditions are below the threshold level, encoding a reduced number of HS-SCCH control information bits into the downlink transmission by omitting one or more HS-SCCH control information bits, wherein the one or more omitted HS-SCCH control information bits are one or more predetermined control information bits.

4. The method according to claim 3, wherein encoding the reduced number of HS-SCCH control information bits into the downlink transmission comprises applying rate matching in dependence on the total number of the one or more omitted HS-SCCH control information bits.

5. A method in a user equipment for decoding a downlink transmission of High-Speed Signalling Control Channel, HS-SCCH control information bits, comprising:

receiving a downlink transmission of High-Speed Signalling Control Channel, HS-SCCH control information bits from a network node, wherein the downlink transmission carries one or more predetermined control information bits that comprise one or more channelization-code-set information bits and/or one or more modulation scheme information bits, or wherein the downlink control channel transmission omits one or more HS-SCCH control information bits that are one or more predetermined control information bits such that the downlink transmission carries a reduced number of HS-SCCH control information bits; and decoding the downlink transmission based on knowledge of the one or more predetermined control information bits.

6. The method according to claim 5, wherein the downlink transmission carries one or more predetermined control information bits that comprise one or more channelization-code-set information bits and/or one or more modulation scheme information bits.

7. The method according to claim 6, wherein decoding the downlink transmission based on knowledge of the one or more predetermined control information bits comprises using a predetermined subset of a set of codewords for use in determining a portion of the downlink transmission to decode the portion of the downlink transmission.

8. The method according to claim 5, wherein the downlink transmission omits one or more HS-SCCH control information bits that are one or more predetermined control information bits such that the downlink transmission carries a reduced number of HS-SCCH control information bits.

9. The method according to claim 8, wherein decoding the downlink transmission based on knowledge of the one or more predetermined control information bits comprises applying rate matching in dependence on the total number of the one or more omitted HS-SCCH control information bits.

10. The method according to claim 5, comprising determining that channel conditions are below a threshold level, and, in response to determining that channel conditions are below a threshold level, decoding the downlink transmission based on knowledge of the one or more predetermined control information bits.

11. The method according to claim 7, wherein the portion of the downlink control channel transmission is part 1 of a High Speed Signalling Control Channel, HS-SCCH.

12. A network node comprising:

transceiver circuitry; and processing circuitry configured to:

determine that channel conditions are below a threshold level;

in response to determining that channel conditions are below the threshold level;

encode one or more High-Speed Signalling Control Channel, HS-SCCH control information bits as one or more predetermined control information bits into a downlink transmission of HS-SCCH control information bits, wherein the one or more predetermined control information bits comprise one or more channelization-code-set information bits and/or one or more modulation scheme information bits; or encode a reduced number of HS-SCCH control information bits into a downlink transmission of HS-SCCH control information bits by omitting one or more HS-SCCH control information bits, wherein the one or more omitted HS-SCCH control information bits are one or more predetermined control information bits; and transmit, via the transceiver circuitry, the encoded HS-SCCH control information bits to a user equipment.

13. The network node according to claim 12, wherein the processing circuitry is configured to, in response to determining that channel conditions are below the threshold level, encode one or more HS-SCCH control information bits as one or more predetermined control information bits into the downlink transmission, wherein the one or more predetermined control information bits comprise one or more channelization-code-set information bits and/or one or more modulation scheme information bits.

14. The network node according to claim 12, wherein the processing circuitry is configured to, in response to determining that channel conditions are below the threshold level, encode a reduced number of HS-SCCH control information bits into the downlink transmission of HS-SCCH control information bits by omitting one or more HS-SCCH control information bits, wherein the one or more omitted HS-SCCH control information bits are one or more predetermined control information bits.

15. The network node according to claim 12, wherein the processing circuitry is configured to encode the reduced number of HS-SCCH control information bits into the downlink transmission by applying rate matching in dependence on the total number of the one or more omitted HS-SCCH control information bits.

16. A user equipment comprising:
   transceiver circuitry; and
   processing circuitry configured to:
      receive, via the transceiver circuitry, a downlink transmission of High-Speed Signalling Control Channel, HS-SCCH control information bits from a network node, wherein the downlink transmission carries one or more predetermined control information bits that comprise one or more channelization-code-set information bits and/or one or more modulation scheme information bits, or wherein the downlink transmission omits one or more HS-SCCH control information bits that are one or more predetermined control information bits such that the downlink transmission carries a reduced number of HS-SCCH control information bits; and
      decode the downlink transmission based on knowledge of the one or more predetermined control information bits.

17. The user equipment according to claim 16, wherein the downlink transmission carries one or more predetermined control information bits that comprise one or more channelization-code-set information bits and/or one or more modulation scheme information bits.

18. The user equipment according to claim 17, wherein the processing circuitry is configured to use a predetermined subset of a set of codewords for use in determining a portion of the downlink transmission to decode the portion of the downlink transmission.

19. The user equipment according to claim 16, wherein the downlink transmission omits one or more HS-SCCH control information bits that are one or more predetermined control information bits such that the downlink transmission carries a reduced number of HS-SCCH control information bits.

20. The user equipment according to claim 19, wherein the processing circuitry is configured to decode the downlink transmission by applying rate matching in dependence on the total number of the one or more omitted HS-SCCH control information bits.

21. The user equipment according to claim 16, wherein the processing circuitry is configured to determine that channel conditions are below a threshold level, and, in response to determining that channel conditions are below a threshold level, decode the downlink transmission based on knowledge of the one or more predetermined control information bits.

22. The user equipment according to claim 18, wherein the portion of the downlink transmission is part 1 of a High Speed Signalling Control Channel, HS-SCCH.

23. The network node according to claim 12, wherein the downlink transmission of HS-SCCH control information bits is a transmission on a High Speed Signalling Control Channel, HS-SCCH, and wherein the processing circuitry is configured to, in response to determining that channel conditions are below the threshold level:
   encode, into part 1 of the HS-SCCH, one or more of the HS-SCCH control information bits as one or more predetermined control information bits that comprise one or more channelization-code-set information bits and/or one or more modulation scheme information bits; and
   encode, into part 2 of the HS-SCCH, a reduced number of HS-SCCH control information bits by omitting one or more predetermined control information bits that comprise one or more transport block size information bits and/or one or more redundancy and constellation version information bits.

24. The user equipment according to claim 16, wherein the downlink transmission of HS-SCCH control information bits is a transmission on a High Speed Signalling Control Channel, HS-SCCH, wherein part 1 of the HS-SCCH carries one or more predetermined control information bits that comprise one or more channelization-code-set information bits and/or one or more modulation scheme information bits, and wherein part 2 of the HS-SCCH omits one or more predetermined control information bits that comprise one or more transport block size information bits and/or one or more redundancy and constellation version information bits.

25. The network node according to claim 14, wherein HS-SCCH control information bits are encodable into the downlink transmission as any codeword from a set of possible codewords that each have the same number of HS-SCCH control information bits, wherein said reduced number of HS-SCCH control information bits is less than said same number of HS-SCCH control information bits, and wherein the processing circuitry is configured to encode, into the downlink transmission, said same number of HS-SCCH control information bits as a codeword from the set of possible codewords or said reduced number of HS-SCCH control information bits as a portion of a codeword from the set of possible codewords, depending respectively on whether channel conditions are above or below the threshold level, wherein the portion of the codeword omits one or more HS-SCCH control information bits whose values are or are not predetermined depending respectively on whether channel conditions are below or above the threshold level.

26. The method of claim 1, wherein the one or more omitted HS-SCCH control information bits are one or more predetermined control information bits that comprise one or more transport block size information bits and/or one or more redundancy and constellation version information bits.

27. The method of claim 5, wherein the one or more omitted HS-SCCH control information bits are one or more predetermined control information bits that comprise one or more transport block size information bits and/or one or more redundancy and constellation version information bits.

28. The method of claim 1, wherein the one or more of the HS-SCCH control information bits that are encoded as one or more predetermined control information bits into the downlink transmission, or the one or more omitted HS-SCCH control information bits, have one or more respective values that are known to the user equipment.

29. The method of claim 5, wherein said knowledge of the one or more predetermined control information bits comprises knowledge of one or more values of the one or more predetermined control information bits.

30. The network node of claim 12, wherein the one or more of the HS-SCCH control information bits that are encoded as one or more predetermined control information bits into the downlink transmission, or the one or more omitted HS-SCCH control information bits, have one or more respective values that are known to the user equipment.

31. The user equipment of claim 16, wherein said knowledge of the one or more predetermined control information bits comprises knowledge of one or more values of the one or more predetermined control information bits.

* * * * *